United States Patent [19]

Hayashi

[11] 4,183,575

[45] Jan. 15, 1980

[54] EXTENSIBLE STAY FOR AUTOMOBILE CLOSURES

[75] Inventor: Toshio Hayashi, Hiroshima, Japan

[73] Assignee: Toyo Kogyo Co., Ltd., Hiroshima, Japan

[21] Appl. No.: 899,842

[22] Filed: Apr. 25, 1978

[30] Foreign Application Priority Data

Apr. 28, 1977 [JP] Japan ............................ 52-54144[U]

[51] Int. Cl.[2] .............................................. B62D 33/00

[52] U.S. Cl. ....................................... 296/56; 296/106

[58] Field of Search ................ 296/29, 30, 31 P, 146, 296/106, 56; 403/23; 16/86 R, 86 A; 292/343; 248/352

[56] References Cited

U.S. PATENT DOCUMENTS

| | | | |
|---|---|---|---|
| 2,076,417 | 4/1937 | Rydquist | 403/23 |
| 3,436,097 | 4/1969 | Love | 280/744 |
| 3,891,111 | 6/1975 | Snazuk | 296/106 |

*Primary Examiner*—Joseph F. Peters, Jr.
*Assistant Examiner*—John A. Carroll
*Attorney, Agent, or Firm*—Fleit & Jacobson

[57] ABSTRACT

An extensible stay extending between a rear end closure and the body of the automobile. The stay is attached to the body at the end adjacent to the body through an L-shaped bracket. A bracket cover is provided to cover the L-shaped bracket so as to avoid any danger by having the bracket exposed. The appearance is also improved by the cover.

10 Claims, 4 Drawing Figures

EXTENSIBLE STAY FOR AUTOMOBILE CLOSURES

BACKGROUND OF THE INVENTION

The present invention relates to extensible stays for automobile closures and more particularly to bracket covers for such stays.

In an automobile having a rear end closure which is hinged to the automobile body at one edge, it is a common practice to provide one or more extensible stays which are pivotably attached at one ends to the closure and at the other ends to the body through suitably designed brackets.

It is an object of the present invention to provide entensible stay means for automobile closures in which the bracket means for attaching the stay means to the automobile body is suitably covered to avoid any danger due to exposure of the bracket means and to provide an improved appearance.

According to the present invention, in order to accomplish the above and other objects, there is provided an automobile including a body formed with a rear end opening, a closure having a side edge at which it is pivotably mounted on said body so as to close the opening therein, at least one extensible stay having one end pivotably attached to the closure and the other end attached to the body, characterized by the fact that an L-shaped bracket is provided between the stay and the body, said bracket having a first leg attached at an outer surface thereof to the stay and a second leg rotatably mounted on the body, a bracket cover for covering the L-shaped bracket, said bracket cover. having a wall for engagement with said outer surface of the first leg on the L-shaped bracket and at least one projection for engagement with an inner surface of the first leg on the bracket so that the first leg is interposed between the wall and the projection of the cover. The wall in the cover may be provided with a slot extending from one edge thereof for receiving said other end of the stay. The cover in accordance with the present invention can be fixed in position simply inserting it in one direction. The cover may further be provided one or more projections adapted to engage the second leg of the bracket so as to correctly position the cover.

The above and other objects and features of the present invention will become apparent from the following descriptions of a preferred embodiment taking reference to the accompanying drawings, in which.

Figure 1:
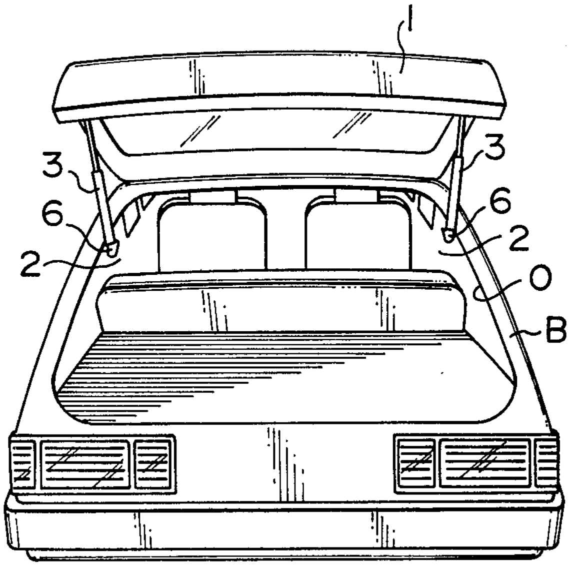
FIG. 1 is a rear end view of an automobile having a rear end opening and an end closure.

Referring to the drawings, there is shown an automobile to which the present invention can be suitably applied. The automobile includes a body B having a rear end opening O and a closure 1 hinged to the body B for closing the opening O. A pair of extensible stays 3 are provided between the body B and the closure 1. Each stay 3 is pivotably attached at one end to the closure 1 in a manner conventionally employed in the art.

Figure 2:
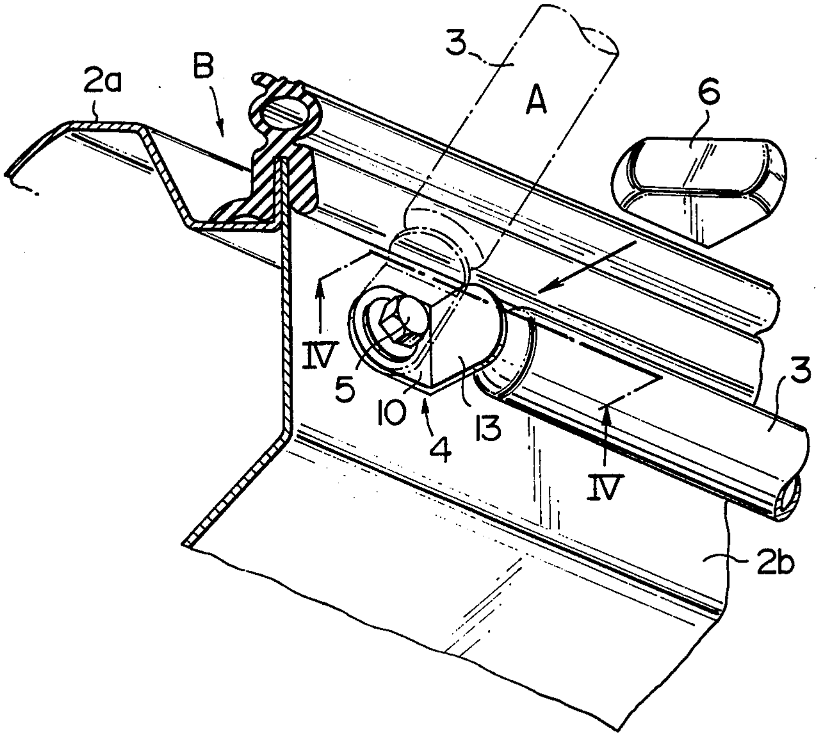
FIG. 2 is a fragmentary perspective view showing the attachment of the stay to the automobile body and the bracket cover.
Figure 4:
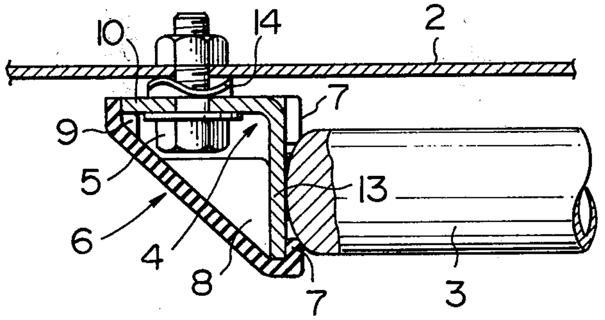

Referring to FIG. 2, there is shown the attachment of the other end of the stay 3 to the body B. The body B is comprised of an outer panel 2*a* and an inner panel 2*b* and the stay 3 is attached to the inner panel 2*b* of the body B by means of an L-shaped bracket 4. As shown in FIGS. 2 and 4, the bracket 4 includes legs 10 and 13 and the stay 3 is secured to the outer surface of the leg 13 by suitable means such as welding. The other leg 10 of the bracket 4 is rotatably mounted on the inner panel 2*b* of the body B by means of a bolt 5. A spring washer 14 is disposed between the leg 10 of the bracket 4 and the inner panel 2 of the body B.

Figure 3:
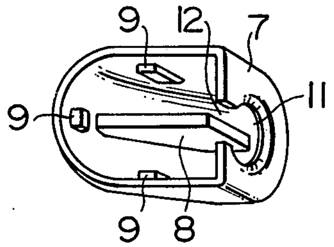
FIG. 3 is a perspective view of the bracket cover in accordance with one embodiment of the present invention; and, FIG. 4 is a sectional view taken along the line IV—IV in FIG. 2 for showing the attachment of the stay to the automobile body.

A bracket cover 6 is of a generally triangular cross-section and has an end wall 7 adapted to be engaged with the outer surface of the leg 13. As shown in FIG. 3, the end wall 7 is formed with a hole 11 which is opened to the edge of the end wall 7 through a slot 12 for receiving the end of the stay 3. Inside the cover 6, there is formed a projection 8 which is adapted to engage the inner surface of the leg 13 so as to hold the leg 13 of the bracket 4 together with the end wall 7. The cover 6 is further formed with projections 9 as shown in FIG. 3 for engagement with the surface of the leg 10 for determining the location of the bracket 4.

The cover 6 as described above can be put into position simply by pushing the cover 6 with the slot 12 in engagement with the end of the stay 3. The stay end is then passed through the slot 12 causing deformation of the end wall 7 until it is received by the hole 11. The cover 6 is then maintained in position by holding the leg 13 between the end wall 7 and the projection 8. The position of the cover 6 is also determined by the projections 9 which engage the leg 10. The cover 6 thus covers the bracket 4 completely so that it is possible to avoid any possibility that a person is injured by the bracket as in the case where the bracket 4 is exposed. Further, the appearance can also be improved.

The invention has thus been shown and described with reference to a specific embodiment, however, it should be noted that the invention is in no way limited to the details of the illustrated structures but changes and modifications may be made without departing from the appended claims.

I claim:

1. Motor vehicle including a body formed with a rear end opening, a closure having a side edge at which said closure is pivotably mounted on said body so as to close the opening therein, at least one extensible stay having one end pivotably attached to the closure and the other end attached to the body, an L-shaped bracket provided between the stay and the body, said bracket having a first leg attached at an outer surface thereof to the stay and a second leg rotatably mounted on the body, a bracket cover for covering the L-shaped bracket, said bracket cover having a wall for engagement with said outer surface of the first leg on the L-shaped bracket and at least one projection for engagement with an inner surface of the first leg on the bracket so that the first leg is interposed between and gripped by the wall and the projection of the cover.

2. Motor vehicle in accordance with claim 1 in which said wall in the cover is formed with a slot extending from one edge thereof for receiving said other end of the stay.

3. Motor vehicle in accordance with claim 2 in which said slot is contiguous with a hole which is wider than the slot and for receiving said other end of the stay.

4. Motor vehicle in accordance with claim 1 in which said cover further includes at least one projection for engagement with the second leg of the bracket.

5. Motor vehicle in accordance with claim 1 in which a pair of stays are provided at opposite sides of the closure.

6. A closure device for use with a motor vehicle including a body formed with an opening, said closure device having a closure with a side edge adapted to be pivotably mounted on the body so as to close the opening in the body, at least one extensible stay having one end pivotably attached to the closure and the other end adapted to be attached to the body, an L-shaped bracket provided between the stay and the body, said bracket having a first leg attached at an outer surface thereof to the stay and a second leg adapted to be rotatably mounted on the body, a bracket cover for covering the L-shaped bracket, said bracket cover having a wall for engagement with said outer surface of the first leg on the L-shaped bracket and at least one projection for engagement with an inner surface of the first leg on the bracket so that the first leg is interposed between the wall and the projection of the cover.

7. A closure device in accordance with claim 6 in which said wall in the cover is formed with a slot extending from one edge thereof for receiving said other end of the stay.

8. A closure device in accordance with claim 7 in which said slot is contiguous with a hole which is wider than the slot and for receiving said other end of the stay.

9. A closure device in accordance with claim 6 in which said cover further includes at least one projection for engagement with the second leg of the bracket.

10. A closure device in accordance with claim 6 in which a pair of stays are provided at opposite sides of the closure.

* * * * *